(12) United States Patent
Liu et al.

(10) Patent No.: US 11,206,518 B2
(45) Date of Patent: *Dec. 21, 2021

(54) ACCESS NETWORK NODE, CORE NETWORK NODE, AND PAGING METHOD

(71) Applicant: Huawei Technologies Co., Ltd., Shenzhen (CN)

(72) Inventors: Lei Liu, Shanghai (CN); Yang Zhao, Shanghai (CN); Chongming Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 138 days.

This patent is subject to a terminal disclaimer.

(21) Appl. No.: 16/586,325

(22) Filed: Sep. 27, 2019

(65) Prior Publication Data

US 2020/0092697 A1 Mar. 19, 2020

Related U.S. Application Data

(63) Continuation of application No. 15/444,025, filed on Feb. 27, 2017, now Pat. No. 10,455,388, which is a continuation of application No. PCT/CN2014/085336, filed on Aug. 27, 2014.

(51) Int. Cl.
*H04W 4/00* (2018.01)
*H04W 4/70* (2018.01)
(Continued)

(52) U.S. Cl.
CPC ............ *H04W 4/70* (2018.02); *H04W 68/00* (2013.01); *H04W 68/08* (2013.01)

(58) Field of Classification Search
CPC .............................. H04W 4/00; H04W 68/00
See application file for complete search history.

(56) References Cited

U.S. PATENT DOCUMENTS

| 9,402,147 B2 | 7/2016 | Hsu et al. |
| 2009/0181672 A1 | 7/2009 | Horn et al. |

(Continued)

FOREIGN PATENT DOCUMENTS

| CN | 102655658 A | 9/2012 |
| CN | 103339967 A | 10/2013 |

(Continued)

OTHER PUBLICATIONS

U.S. Appl. No. 15/444,025, filed Feb. 27, 2017.

(Continued)

*Primary Examiner* — Zhiren Qin (74) *Attorney, Agent, or Firm* — Leydig, Voit & Mayer, Ltd.

(57) ABSTRACT

Embodiments of the present invention disclose an access network node, a core network node, and a paging method, and relate to the communications field, so as to resolve a problem that an M2M service cannot be normally used because a network side cannot determine whether a coverage enhancement technology needs to be used in a paging process. A specific solution is as follows: A communications interface is configured to receive a first packet paging message sent by a core network node; a processor determines, according to the first packet paging message received by using the communications interface, that a terminal is an M2M terminal; and a transmitter sends a coverage-enhanced second packet paging message to the terminal. The present invention is used in a paging process.

10 Claims, 4 Drawing Sheets

(51) Int. Cl.
*H04W 68/00* (2009.01)
*H04W 68/08* (2009.01)

(56) References Cited

U.S. PATENT DOCUMENTS

| | | | |
|---|---|---|---|
| 2009/0182871 A1 | 7/2009 | Gupta et al. | |
| 2010/0069062 A1 | 3/2010 | Horn et al. | |
| 2011/0140846 A1 | 6/2011 | Blanz et al. | |
| 2011/0244907 A1 | 10/2011 | Golaup et al. | |
| 2012/0015655 A1 | 1/2012 | Lee | |
| 2012/0184205 A1 | 7/2012 | Luft et al. | |
| 2012/0252481 A1 | 10/2012 | Anpat et al. | |
| 2013/0015953 A1 | 1/2013 | Hsu et al. | |
| 2013/0039309 A1 | 2/2013 | Chiu et al. | |
| 2013/0136045 A1 | 5/2013 | Batchu et al. | |
| 2013/0136072 A1* | 5/2013 | Bachmann | H04W 68/00 370/329 |
| 2014/0098761 A1 | 4/2014 | Lee et al. | |
| 2015/0365914 A1* | 12/2015 | Yu | H04W 16/14 455/458 |
| 2016/0157208 A1* | 6/2016 | Liang | H04W 72/005 455/458 |
| 2016/0205659 A1* | 7/2016 | Bergman | H04L 1/1812 370/252 |
| 2016/0212727 A1* | 7/2016 | Hu | H04W 68/02 |

FOREIGN PATENT DOCUMENTS

| | | |
|---|---|---|
| CN | 103959878 A | 7/2014 |
| EP | 2844011 A1 | 3/2015 |
| EP | 2953409 A1 | 12/2015 |
| EP | 3043607 A1 | 7/2016 |
| WO | 2013174297 A1 | 11/2013 |
| WO | 2014121518 A1 | 8/2014 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300, V12.2.0, 3rd Generation Partnership Project, Valbonne, France (Jun. 2014).

"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331, V12.2.0, 3rd Generation Partnership Project, Valbonne, France (Jun. 2014).

"3rd Generation partnership Project; Technical Specification Group Radio Access Network; Evolved Universal Terrestrial Radio Access Network (E-UTRAN); S1 Application Protocol (S1AP) (Release 12)," 3GPP TS 36.413, v12.2.0, 3rd Generation Partnership Project, Valbonne, France (Jun. 2014).

"Base station knowledge of low complexity UE," 3GPP TSG-RAN WG1 Meeting #74, Seoul, Korea, R1-142372, pp. 1-4, 3rd Generation Partnership Project, Valbonne, France (May 19-23, 2014).

"[DRAFT] LS on eNB knowledge of low complexity UEs," 3GPP TSG-RAN WG1 Meeting #77, Seoul, Korea, R1-142705, pp. 1-2, 3rd Generation Partnership Project, Valbonne, France (May 19-23, 2014).

"Acquisition of network originated data by MTC UEs in enhanced coverage mode," 3GPP TSG RAN WG2 #85, Prague, Czech Republic, R2-140629, pp. 1-4, 3rd Generation Partnership Project, Valbonne, France (Feb. 10-14, 2014).

"Paging mechanism for low cost UEs," 3GPP TSG-RAN WG2 #85bis, Valencia, Spain, Tdoc R2-141304, pp. 1-4, 3rd Generation Partnership Project, Valbonne,France (Mar. 31-Apr. 4, 2014).

"Impacts of low-cost MTC on RAN2," 3GPP TSG-RAN2 #85bis Meeting, Valencia, Spain, R2-141434, 3rd Generation Partnership Project, Valbonne, France (Mar. 31-Apr. 4, 2014).

"DRAFT LS on introducing signaling to indicate low complexity UEs," 3GPP TSG RAN WG2 Meeting #86, Seoul, South Korea, R2-142568, 3rd Generation Partnership Project, Valbonne, France (May 19-23, 2014).

"Single Rx antenna capability and paging," 3GPP TSG RAN WG2 #87, Dresden, Germany, Tdoc R2-143326, pp. 1-6, 3rd Generation Partnership Project, Valbonne, France (Aug. 18-22, 2014).

"3rd Generation Partnership Project; Technical Specification Group Services and System Aspects; Service requirements for Machine-Type Communications (MTC); Stage 1 (Release 13)" (22.368 hereinafter) was released as Technical Specification published Jun. 2014, 3GPP TS 22 368 V13 0.0, 3rd Generation Partnership Project, Valbonne, France (Jun. 2014).

"3rd Generation Partnership Project; Technical Specification Group Services and System Aspects; Architecture enhancements to facilitate communications with packet data networks and applications (Release 12)" 3GPP TS 23.682 V12.2.0, 3rd Generation Partnership Project, Valbonne, France (Jun. 2014).

* cited by examiner

ACCESS NETWORK NODE, CORE NETWORK NODE, AND PAGING METHOD

CROSS-REFERENCE TO RELATED APPLICATIONS

This application is a continuation of U.S. application Ser. No. 15/444,025, filed on Feb. 27, 2017, which is a continuation of International Patent Application No. PCT/CN2014/085336, filed on Aug. 27, 2014. All of the afore-mentioned patent applications are hereby incorporated by reference in their entireties.

TECHNICAL FIELD

Embodiments of the present invention relate to the communications field, and in particular, to an access network node, a core network node, and a paging method.

BACKGROUND

With development of Internet of Things, machine to machine (M2M) services emerge. Communication between machines may be implemented by using the M2M services and a wireless network bearer. Currently, the M2M services are widely used in fields such as intelligent power, intelligent transportation, and smart household. For example, in the intelligent power field, a remote meter reading service may be implemented by using an M2M terminal.

As is well known, if no packet data needs to be transmitted between an M2M terminal and a network side before a T3314 timer expires, the terminal changes from a ready state to a standby state. After the M2M terminal enters a standby state, if the network side needs to send packet data to the M2M terminal, the network side first needs to page the M2M terminal to establish a connection to the M2M terminal, and then sends the packet data to the M2M terminal. Because the M2M terminal is usually deployed in airtight space such as a basement, to successfully page the M2M terminal, the network side needs to use a coverage enhancement technology in a process of paging the M2M terminal.

In the prior art, when a network side needs to send downlink information, whether the coverage enhancement technology needs to be used for sending the downlink information may be determined according to uplink information sent by a terminal. However, before the network side performs paging, an M2M terminal does not send any uplink information to the network side. Therefore, the network side cannot determine whether the coverage enhancement technology needs to be used in a paging process, and normal use of an M2M service cannot be ensured.

SUMMARY

Embodiments of the present invention provide an access network node, a core network node, and a paging method, so as to resolve a problem that an M2M service cannot be normally used because a network side cannot determine whether a coverage enhancement technology needs to be used in a paging process.

To achieve the foregoing objective, the following technical solutions are used in the embodiments of the present invention.

According to a first embodiment of the present invention, an access network node is provided and includes a communications interface, a processor, and a transmitter, where:

the communications interface is configured to receive a first packet paging message sent by a core network node, where the first packet paging message is used for paging a terminal;

the processor is configured to determine, according to the first packet paging message received by using the communications interface, that the terminal is a machine to machine M2M terminal; and the transmitter is configured to send a coverage-enhanced second packet paging message to the terminal.

With reference to the first embodiment of the present invention, in a first possible implementation manner, the first packet paging message includes terminal information of the terminal, and the terminal information includes a terminal type; and the processor is specifically configured to determine, according to the terminal type included in the terminal information, that the terminal is the M2M terminal.

With reference to the first possible implementation manner of the first embodiment of the present invention, in a second possible implementation manner, the terminal information further includes a terminal coverage level, and the coverage level is used by the access network node to determine a coverage enhancement level when the access network node pages the terminal; and the transmitter is specifically configured to send the coverage-enhanced second packet paging message to the terminal according to the terminal coverage level.

With reference to the second possible implementation manner of the first embodiment of the present invention, in a third possible implementation manner, the access network node further includes a receiver, where:

the receiver is configured to receive a new coverage level sent by the terminal, and the communications interface is further configured to send, to the core network node, the new coverage level received by the receiver; or the receiver is configured to receive coverage information sent by the terminal, the processor is further configured to determine a new coverage level according to the coverage information received by the receiver, and the communications interface is further configured to send, to the core network node, the new coverage level obtained by the processor; or the receiver is configured to receive coverage information sent by the terminal, and the communications interface is further configured to send, to the core network node, the coverage information received by the receiver.

With reference to the first embodiment of the present invention, in a fourth possible implementation manner, the first packet paging message includes an international mobile subscriber identity IMSI of the terminal; and the processor is specifically configured to: obtain a terminal type according to the IMSI and a pre-stored mapping table, where the mapping table includes the IMSI and the terminal type corresponding to the IMSI; and determine, according to the terminal type, that the terminal is the M2M terminal.

With reference to the fourth possible implementation manner of the first embodiment of the present invention, in a fifth possible implementation manner, the mapping table further includes a terminal coverage level corresponding to the IMSI; and the transmitter is specifically configured to obtain the terminal coverage level according to the IMSI and the mapping table, and send the coverage-enhanced second packet paging message to the terminal according to the terminal coverage level.

With reference to the fifth possible implementation manner of the first embodiment of the present invention, in a sixth possible implementation manner, the access network node further comprises a receiver, the receiver is further configured to receive a new coverage level sent by the terminal, and the processor is further configured to update the terminal coverage level in the mapping table according to the new coverage level received by the receiver; or the receiver is further configured to receive coverage information sent by the terminal, and the processor is further configured to determine a new coverage level according to the coverage information received by the receiver, and update the terminal coverage level in the mapping table according to the new coverage level.

According to a second embodiment of the present invention, a core network node is provided and includes a communications interface, where:

the communications interface is configured to send a first packet paging message to an access network node, where the first packet paging message is used for paging a terminal, the first packet paging message includes terminal information of the terminal, and the terminal information includes a terminal type.

With reference to the second embodiment of the present invention, in a first possible implementation manner, the terminal information further includes a terminal coverage level, and the coverage level is used by the access network node to determine a coverage enhancement level when the access network node pages the terminal.

With reference to the first possible implementation manner of the second embodiment of the present invention, in a second possible implementation manner, the core network node further includes a processor, where:

the processor is configured to obtain the terminal information according to an international mobile subscriber identity IMSI of the terminal and a pre-stored mapping table before the first packet paging message is sent to the access network node by using the communications interface, where the mapping table includes the IMSI and the terminal information that corresponds to the IMSI and that is of the terminal.

With reference to the second possible implementation manner of the second embodiment of the present invention, in a third possible implementation manner, the communications interface is further configured to receive a new coverage level sent by the access network node, and the processor is further configured to update the terminal coverage level in the terminal information according to the new coverage level received by using the communications interface; or the communications interface is further configured to receive coverage information sent by the access network node, and the processor is further configured to determine a new coverage level according to the coverage information received by using the communications interface, and update the terminal coverage level in the terminal information according to the new coverage level.

According to a third embodiment of the present invention, a paging method is provided and includes:

receiving, by an access network node, a first packet paging message sent by a core network node, where the first packet paging message is used for paging a terminal;

determining, by the access network node according to the first packet paging message, that the terminal is a machine to machine M2M terminal; and sending, by the access network node, a coverage-enhanced second packet paging message to the terminal.

With reference to the third embodiment of the present invention, in a first possible implementation manner, the first packet paging message includes terminal information of the terminal, and the terminal information includes a terminal type; and the determining, by the access network node according to the first packet paging message, that the terminal is a machine to machine M2M terminal includes:

determining, by the access network node according to the terminal type included in the terminal information, that the terminal is the M2M terminal.

With reference to the first possible implementation manner of the third embodiment of the present invention, in a second possible implementation manner, the terminal information further includes a terminal coverage level, and the coverage level is used by the access network node to determine a coverage enhancement level when the access network node pages the terminal; and the sending, by the access network node, a coverage-enhanced second packet paging message to the terminal includes:

sending, by the access network node, the coverage-enhanced second packet paging message to the terminal according to the terminal coverage level.

With reference to the second possible implementation manner of the third embodiment of the present invention, in a third possible implementation manner, the method further includes:

receiving, by the access network node, a new coverage level sent by the terminal, and sending the new coverage level to the core network node; or receiving, by the access network node, coverage information sent by the terminal, determining a new coverage level according to the coverage information, and sending the new coverage level to the core network node; or receiving, by the access network node, coverage information sent by the terminal, and sending the coverage information to the core network node.

With reference to the third embodiment of the present invention, in a fourth possible implementation manner, the first packet paging message includes an international mobile subscriber identity IMSI of the terminal; and the determining, by the access network node according to the first packet paging message, that the terminal is a machine to machine M2M terminal includes:

obtaining, by the access network node, a terminal type according to the IMSI and a pre-stored mapping table, where the mapping table includes the IMSI and the terminal type corresponding to the IMSI; and determining, by the access network node according to the terminal type, that the terminal is the M2M terminal.

With reference to the fourth possible implementation manner of the third embodiment of the present invention, in a fifth possible implementation manner, the mapping table further includes a terminal coverage level corresponding to the IMSI; and the sending, by the access network node, a coverage-enhanced second packet paging message to the terminal includes:

obtaining, by the access network node, the terminal coverage level according to the IMSI and the mapping table; and sending, by the access network node, the coverage-enhanced second packet paging message to the terminal according to the terminal coverage level.

With reference to the fifth possible implementation manner of the third embodiment of the present invention, in a sixth possible implementation manner, the method further includes:

receiving, by the access network node, a new coverage level sent by the terminal; or receiving, by the access network node, coverage information sent by the terminal, and determining a new coverage level according to the coverage information; and updating, by the access network node, the terminal coverage level in the mapping table according to the new coverage level.

According to a fourth embodiment of the present invention, a paging method is provided and includes:

sending, by a core network node, a first packet paging message to an access network node, where the first packet paging message is used for paging a terminal, the first packet paging message includes terminal information of the terminal, and the terminal information includes a terminal type.

With reference to the fourth embodiment of the present invention, in a first possible implementation manner, the terminal information further includes a terminal coverage level, and the coverage level is used by the access network node to determine a coverage enhancement level when the access network node pages the terminal.

With reference to the first possible implementation manner of the fourth embodiment of the present invention, in a second possible implementation manner, before the sending, by a core network node, a first packet paging message to an access network node, the method further includes:

obtaining, by the core network node, the terminal information according to an international mobile subscriber identity IMSI of the terminal and a pre-stored mapping table, where the mapping table includes the IMSI and the terminal information that corresponds to the IMSI and that is of the terminal.

With reference to the second possible implementation manner of the fourth embodiment of the present invention, in a third possible implementation manner, the method further includes:

receiving, by the core network node, a new coverage level sent by the access network node; or receiving coverage information sent by the access network node, and determining a new coverage level according to the coverage information; and updating, by the core network node, the terminal coverage level in the terminal information according to the new coverage level.

According to the access network node, the core network node, and the paging method that are provided in the embodiments of the present invention, after receiving a first packet paging message sent by the core network node, the access network node can determine, according to the first packet paging message, whether a paged terminal is an M2M terminal, and send a coverage-enhanced second packet paging message to the terminal after determining that the paged terminal is the M2M terminal. The access network node can determine a type of the paged terminal by using the first packet paging message sent by the core network node, and send a corresponding second packet paging message to the terminal according to the determined type of the terminal. Therefore, after determining that the paged terminal is the M2M terminal, the access network node sends the coverage-enhanced second packet paging message to the terminal, and normal use of an M2M service of the terminal is ensured.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In addition, the terms "system" and "network" may be used interchangeably in this specification. The term "and/or" in this specification describes only an association relationship for associated objects and represents that three relationships may exist. For example, A and/or B may represent the following three cases: Only A exists, both A and B exist, and only B exists. In addition, the character "/" in this specification generally indicates an "or" relationship between the associated objects.

Figure 1:
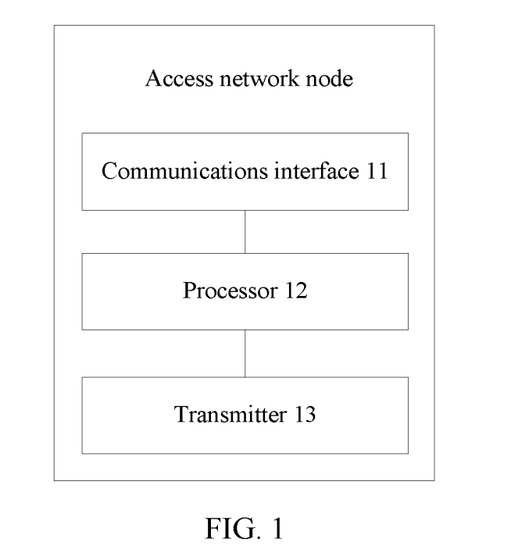
FIG. 1 is a schematic composition diagram of an access network node according to an embodiment of the present invention.

An embodiment of the present invention provides an access network node. As shown in FIG. 1, the access network node may include a communications interface 11, a processor 12, and a transmitter 13.

The communications interface 11 is configured to receive a first packet paging message sent by a core network node, and the first packet paging message is used for paging a terminal.

The processor 12 is configured to determine, according to the first packet paging message received by using the communications interface 11, that the terminal is an M2M terminal.

The transmitter 13 is configured to send a coverage-enhanced second packet paging message to the terminal.

In this embodiment of the present invention, the first packet paging message further includes terminal information of the terminal, and the terminal information includes a terminal type.

The processor 12 is specifically configured to determine, according to the terminal type included in the terminal information, that the terminal is the M2M terminal.

In this embodiment of the present invention, the terminal information further includes a terminal coverage level, and the coverage level is used by the access network node to determine a coverage enhancement level when the access network node pages the terminal.

The transmitter 13 is specifically configured to send the coverage-enhanced second packet paging message to the terminal according to the terminal coverage level.

Figure 2:
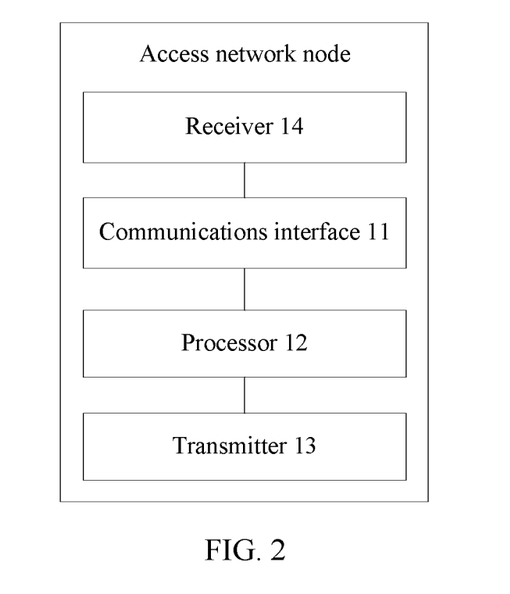
FIG. 2 is a schematic composition diagram of another access network node according to an embodiment of the present invention.

In this embodiment of the present invention, further, as shown in FIG. 2, the access network node may further include a receiver 14.

The receiver 14 is configured to receive a new coverage level sent by the terminal, and the communications interface 11 is further configured to send, to the core network node, the new coverage level received by the receiver 14; or the receiver 14 is configured to receive coverage information sent by the terminal, the processor 12 is further configured to determine a new coverage level according to the coverage information received by the receiver 14, and the communications interface 11 is further configured to send, to the core network node, the new coverage level obtained by the processor 12; or the receiver 14 is configured to receive coverage information sent by the terminal, and the communications interface 11 is further configured to send, to the core network node, the coverage information received by the receiver 14.

In this embodiment of the present invention, the first packet paging message further includes an international mobile subscriber identity (IMSI) of the terminal. The processor 12 is specifically configured to obtain a terminal type according to the IMSI and a pre-stored mapping table, and determine, according to the obtained terminal type, that the terminal is the M2M terminal. The mapping table includes the IMSI and the terminal type corresponding to the IMSI.

In this embodiment of the present invention, further, the mapping table further includes a terminal coverage level corresponding to the IMSI.

The transmitter 13 is specifically configured to obtain the terminal coverage level according to the IMSI and the mapping table, and send the coverage-enhanced second packet paging message to the terminal according to the terminal coverage level.

In this embodiment of the present invention, further, the receiver 14 is further configured to receive a new coverage level sent by the terminal, and the processor 12 is further configured to update the terminal coverage level in the mapping table according to the new coverage level received by the receiver 14; or the receiver 14 is further configured to receive coverage information sent by the terminal, and the processor 12 is further configured to determine a new coverage level according to the coverage information received by the receiver 14, and update the terminal coverage level in the mapping table according to the determined new coverage level.

It should be noted that, for specific descriptions of function modules in the access network node provided in this embodiment of the present invention, refer to specific descriptions of corresponding content in method embodiments. Details are not described in this embodiment of the present invention.

According to the access network node provided in this embodiment of the present invention, after a first packet paging message sent by a core network node is received, whether a paged terminal is an M2M terminal may be determined according to the first packet paging message, and after the paged terminal is determined as the M2M terminal, a coverage-enhanced second packet paging message is sent to the terminal. The access network node can determine a type of the paged terminal by using the first packet paging message sent by the core network node, and send a corresponding second packet paging message to the terminal according to the determined type of the terminal. Therefore, after determining that the paged terminal is the M2M terminal, the access network node sends the coverage-enhanced second packet paging message to the terminal, and normal use of an M2M service of the terminal is ensured.

In addition, the first packet paging message sent by the core network node to the access network node may further include a terminal coverage level. After receiving the first packet paging message, the access network node may send the coverage-enhanced second packet paging message to the terminal according to the terminal coverage level included in the first packet paging message. Alternatively, when a mapping table further includes a terminal coverage level, the access network node can determine, according to an IMSI that is included in the first packet paging message sent by the core network node and that is of the terminal, the coverage level of the terminal that needs to be paged. In this way, the access network node may send a coverage-enhanced second packet paging message of a corresponding level to the terminal according to the obtained terminal coverage level. The access network node sends the coverage-enhanced second packet paging message of the corresponding level to the terminal according to a coverage requirement of the terminal, so that a paging success rate of the M2M terminal is increased, and the normal use of the M2M service of the terminal is further ensured.

Figure 3:
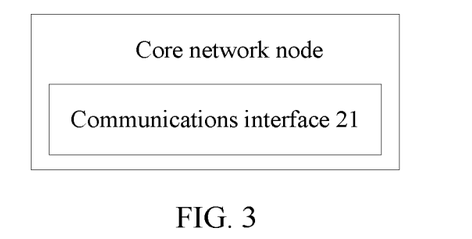
FIG. 3 is a schematic composition diagram of a core network node according to another embodiment of the present invention.

Another embodiment of the present invention provides a core network node. As shown in FIG. 3, the core network node may include a communications interface 21.

The communications interface 21 is configured to send a first packet paging message to an access network node, where the first packet paging message is used for paging a terminal, the first packet paging message includes terminal information of the terminal, and the terminal information includes a terminal type.

In this embodiment of the present invention, further, the terminal information further includes a terminal coverage level, and the coverage level is used by the access network node to determine a coverage enhancement level when the access network node pages the terminal.

Figure 4:
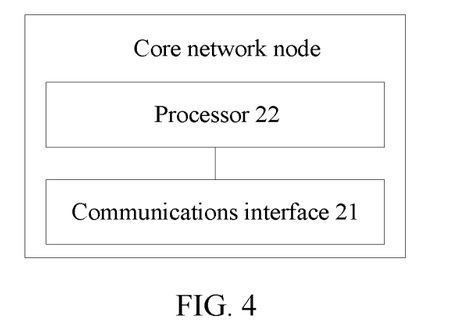
FIG. 4 is a schematic composition diagram of another core network node according to another embodiment of the present invention.

In this embodiment of the present invention, further, as shown in FIG. 4, the core network node may further include a processor 22.

The processor 22 is configured to obtain the terminal information according to an IMSI of the terminal and a pre-stored mapping table before the first packet paging message is sent to the access network node by using the communications interface 21. The mapping table includes the IMSI and the terminal information that corresponds to the IMSI and that is of the terminal.

In this embodiment of the present invention, further, the communications interface 21 is further configured to receive a new coverage level sent by the access network node, and the processor 22 is further configured to update the terminal coverage level in the terminal information according to the new coverage level received by using the communications interface 21; or the communications interface 21 is further configured to receive coverage information sent by the access network node, and the processor 22 is further configured to determine a new coverage level according to the coverage information received by using the communications interface 21, and update the terminal coverage level in the terminal information according to the determined new coverage level.

It should be noted that, for specific descriptions of function modules in the core network node provided in this embodiment of the present invention, refer to specific descriptions of corresponding content in method embodiments. Details are not described in this embodiment of the present invention.

According to the core network node provided in this embodiment of the present invention, a first packet paging message including terminal information is sent to an access network node, so that after receiving the first packet paging message sent by the core network node, the access network node can determine, according to the terminal information that is carried in the first packet paging message and that includes a terminal type, whether a paged terminal is an M2M terminal, and send a coverage-enhanced second packet paging message to the terminal after determining that the paged terminal is the M2M terminal. The first packet paging message sent by the core network node to the access network node includes the type of the paged terminal, so that the access network node can determine the type of the paged terminal according to the received first packet paging message, and send a corresponding second packet paging message to the terminal according to the determined type of the terminal. Therefore, after determining that the paged terminal is the M2M terminal, the access network node sends the coverage-enhanced second packet paging message to the terminal, and normal use of an M2M service of the terminal is ensured.

In addition, the first packet paging message sent by the core network node to the access network node may further include a terminal coverage level. After receiving the first packet paging message, the access network node may send the coverage-enhanced second packet paging message to the terminal according to the terminal coverage level included in the first packet paging message. In this way, the access network node may send a coverage-enhanced second packet paging message of a corresponding level to the terminal according to a coverage requirement of the terminal, so that a paging success rate of the M2M terminal is increased, and the normal use of the M2M service of the terminal is further ensured.

Figure 5:
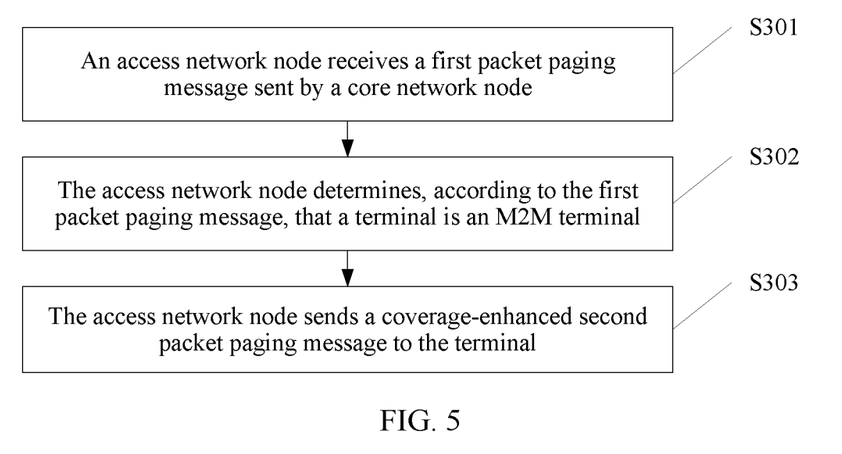
FIG. 5 is a flowchart of a paging method according to another embodiment of the present invention.

Another embodiment of the present invention provides a paging method. As shown in FIG. 5, the method may include the following steps.

S301. An access network node receives a first packet paging message sent by a core network node.

The first packet paging message is used for paging a terminal, and the first packet paging message includes information used to determine that the paged terminal is an M2M terminal.

S302. The access network node determines, according to the first packet paging message, that a terminal is an M2M terminal.

After receiving the first packet paging message sent by the core network node, the access network node can determine, according to the first packet paging message, whether the terminal paged by the core network node is the M2M terminal. After the terminal paged by the core network node is determined as the M2M terminal, perform S303. Specifically, the access network node may determine, according to the information that is included in the first packet paging message and that is used to determine that the paged terminal is the M2M terminal, whether the terminal paged by the core network node is the M2M terminal.

S303. The access network node sends a coverage-enhanced second packet paging message to the terminal.

Because the M2M terminal is usually deployed in airtight space such as a basement, to successfully page the M2M terminal, the access network node may send the coverage-enhanced second packet paging message to the terminal after determining that the terminal paged by the core network node is the M2M terminal, so that the terminal is successfully paged, and normal use of an M2M service running on the terminal is ensured.

According to the paging method provided in this embodiment of the present invention, after receiving a first packet paging message sent by a core network node, an access network node can determine, according to the first packet paging message, whether a paged terminal is an M2M terminal, and send a coverage-enhanced second packet paging message to the terminal after determining that the paged terminal is the M2M terminal. The access network node can determine a type of the paged terminal by using the first packet paging message sent by the core network node, and send a corresponding second packet paging message to the terminal according to the determined type of the terminal. Therefore, after determining that the paged terminal is the M2M terminal, the access network node sends the coverage-enhanced second packet paging message to the terminal, and normal use of an M2M service of the terminal is ensured.

Figure 6:
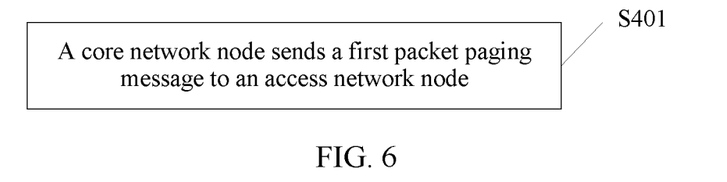
FIG. 6 is a flowchart of a paging method according to another embodiment of the present invention.

Another embodiment of the present invention provides a paging method. As shown in FIG. 6, the method may include the following step:

S401. A core network node sends a first packet paging message to an access network node.

The first packet paging message is used for paging a terminal, the first packet paging message includes terminal information of the paged terminal, and the terminal information includes a type of the paged terminal. Because an M2M terminal is usually deployed in airtight space such as a basement, to successfully page the M2M terminal, the core network node may add the type of the paged terminal to the first packet paging message sent to the access network node. After receiving the first packet paging message, the access network node can determine, according to the terminal type included in the first packet paging message, whether the paged terminal is an M2M terminal, and send a coverage-enhanced second packet paging message to the terminal after determining that the paged terminal is the M2M terminal, so that the terminal is successfully paged, and normal use of an M2M service of the terminal is ensured.

According to the paging method provided in this embodiment of the present invention, a core network node may send a first packet paging message including a terminal type to an access network node, so that after receiving the first packet paging message sent by the core network node, the access network node can determine, according to the first packet paging message, whether a paged terminal is an M2M terminal, and send a coverage-enhanced second packet paging message to the terminal after determining that the paged terminal is the M2M terminal. The first packet paging message sent by the core network node to the access network node includes the type of the paged terminal, so that the access network node can determine, according to the received first packet paging message, the type of the paged terminal, and send a corresponding second packet paging message to the terminal according to the determined type of the terminal. Therefore, after determining that the paged terminal is the M2M terminal, the access network node sends the coverage-enhanced second packet paging message to the terminal, and normal use of an M2M service of the terminal is ensured.

Figure 7:
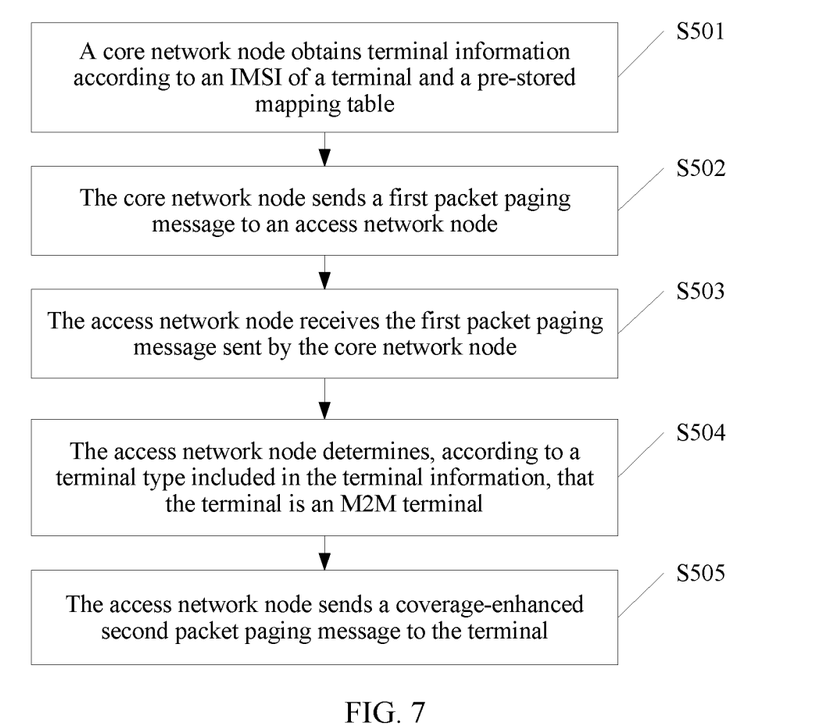
FIG. 7 is a flowchart of a paging method according to another embodiment of the present invention.

Another embodiment of the present invention provides a paging method. As is well known, an M2M terminal is usually deployed in airtight space such as a basement. To successfully page an M2M terminal, an access network node needs to use a coverage enhancement technology in a process of paging the M2M terminal. However, the access network node does not know whether a type of a paged terminal is the M2M terminal in the paging process. Therefore, the access network node cannot determine whether the coverage enhancement technology needs to be used, and consequently, an M2M service cannot be normally used. To ensure normal use of the M2M service, in one application scenario, information that is included in a first packet paging message and that is used to determine that the paged terminal is the M2M terminal is terminal information of the terminal. In this case, the access network node can determine the type of the paged terminal according to the terminal information that is included in the received first packet paging message and that is of the terminal, and send a coverage-enhanced second packet paging message to the terminal after determining that the paged terminal is the M2M terminal. Specifically, as shown in FIG. 7, this method may include the following steps.

S501. A core network node obtains terminal information according to an IMSI of a terminal and a pre-stored mapping table.

The pre-stored mapping table in the core network node includes the IMSI of the terminal and the terminal information that corresponds to the IMSI and that is of the terminal, and the terminal information may include a terminal type.

The core network node may obtain, according to registration information of the terminal, the IMSI of the terminal and the terminal type corresponding to the IMSI, and store, in the terminal information in the mapping table, the obtained IMSI of the terminal and the obtained terminal type corresponding to the IMSI.

For example, the IMSI of the terminal and the terminal type corresponding to the IMSI may be obtained by the core network node according to subscription information of the terminal, or the IMSI of the terminal and the terminal type corresponding to the IMSI may be obtained according to an upper-layer service used by the terminal. A manner for obtaining the IMSI of the terminal and the terminal type corresponding to the IMSI is not specifically limited in this embodiment of the present invention.

Further, the terminal information may further include a terminal coverage level, that is, the mapping table may further include a terminal coverage level corresponding to the IMSI. The coverage level is used by the access network node to determine a coverage enhancement level when the access network node pages the terminal.

The core network node may obtain the terminal coverage level corresponding to the IMSI of the terminal when the terminal accesses a network, and store, in the terminal information in the mapping table, the obtained terminal coverage level corresponding to the IMSI. After the terminal accesses the network, the terminal coverage level may change. Therefore, the core network node needs to update the terminal coverage level that is in the terminal information and that corresponds to the IMSI of the terminal. Specifically, when the terminal coverage level changes, the core network node may obtain, in any one of the following manners, a new coverage level that is of the terminal and that corresponds to the IMSI of the terminal, and then update, according to the new coverage level, the terminal coverage level that is in the terminal information and that corresponds to the IMSI of the terminal.

Manner 1: The core network node receives a new coverage level sent by the access network node, and updates the terminal coverage level in the terminal information according to the received new coverage level.

In a possible implementation manner, a manner for receiving, by the core network node, the new coverage level sent by the access network node is as follows: The access network node receives a new coverage level sent by the terminal, and then sends the received new coverage level to the core network node. In this case, the core network node can receive the new coverage level sent by the access network node. Specifically, the new coverage level sent by the access network node may be obtained by the core network node in any one of the following procedures.

Procedure 1: The new coverage level sent by the access network node may be obtained by the core network node in a routing area update procedure. The routing area update procedure may be triggered in the following manners: The terminal detects a routing area change, or the terminal enables a general packet radio service technology (GPRS) service again, or the terminal needs to use a new wireless access capability to update the network, or the terminal periodically notifies the network of accessibility of the terminal. For example, the routing area update procedure may be shown in FIG. 8.

Figure 8:
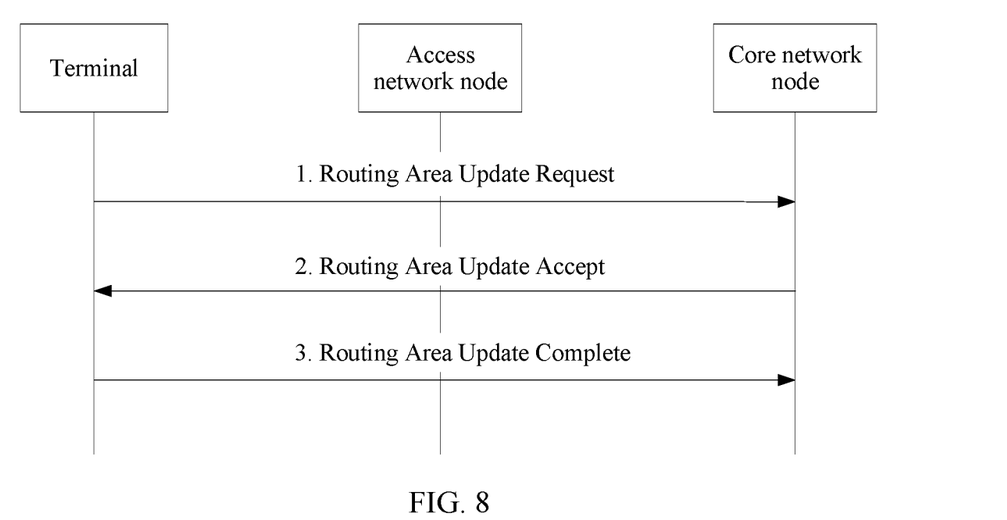
FIG. 8 is a flowchart of routing area update according to another embodiment of the present invention.

1. The terminal sends a Routing Area Update Request message to the core network node by means of the access network node.

2. If the core network node allows the terminal to be attached to a new routing area, mobility management (MM) context of the terminal may be updated, a new packet-temporary mobile subscriber identity (P-TMSI) is allocated to the terminal, and a Routing Area Update Accept message is sent to the terminal by means of the access network node.

3. If the terminal receives the P-TMSI allocated by the core network node, that is, the P-TMSI is successfully allocated, the terminal sends a Routing Area Update Complete message to the core network node by means of the access network node.

In the routing area update procedure shown in FIG. 8, the terminal may report the new coverage level of the terminal to the core network node by adding an optional information element to the Routing Area Update Request message or a Routing Area Update Complete message. That is, the terminal may add, to the Routing Area Update Request message or the Routing Area Update Complete message, the optional information element that carries the new coverage level of the terminal, so as to report the new coverage level of the terminal to the core network node.

Procedure 2: The new coverage level sent by the access network node may be obtained by the core network node in a cell update procedure. When the terminal is in a ready state under an idle mode or a transmission mode, and a cell in which the terminal is located changes, but a routing area in which the terminal is located does not change, the terminal triggers the cell update procedure.

For example, when the terminal is in the ready state under the idle mode, and the cell in which the terminal is located changes, but the routing area in which the terminal is located does not change, the cell update procedure initiated by the terminal may be specifically as follows: The terminal sends any message to the access network node, and after receiving the any message, the access network node adds a cell global identity to the any message, and sends the any message to the core network node. After the core network node receives the any message that carries the cell global identity, if the core network node discovers that the cell global identity carried in the any message is inconsistent with a cell global identity that is stored in the core network node and that corresponds to the terminal, the core network node determines that the terminal initiates the cell update procedure. Alternatively, to be simpler, the cell update procedure initiated by the terminal may be specifically as follows: The terminal sends a specific message to the core network node by means of the access network node, so as to initiate the cell update procedure.

When the terminal initiates the cell update procedure by sending any message, the terminal may add the new coverage level of the terminal to the any message, and send the any message to the core network node by means of the access network node, so that the core network node obtains the new coverage level of the terminal according to the received any message. When the terminal initiates the cell update procedure by sending a specific message, the terminal may add the new coverage level of the terminal to the specific message, and send the specific message to the core network node by means of the access network node, so that the core network node obtains the new coverage level of the terminal according to the received specific message.

For example, when the terminal is in the ready state under the transmission mode, and the cell in which the terminal is located changes, but the routing area in which the terminal is located does not change, the cell update procedure initiated by the terminal may be specifically as follows: The terminal sends a Cell Update message to the core network node by means of the access network node, to initiate the cell update procedure. The Cell Update message is sent by the terminal after a more appropriate neighboring cell is discovered by means of measurement in a packet transmission process.

The terminal may add the new coverage level of the terminal to the Cell Update message, and send the message to the core network node by means of the access network node, so that the core network node obtains the new coverage level of the terminal according to the received Cell Update message.

Procedure 3: The new coverage level sent by the access network node may be obtained by the core network node in a random access procedure. After the terminal is blocked by an obstacle or the terminal in an idle state performs cell reselection, the terminal needs a higher coverage level to ensure relatively good service transmission. In this case, the terminal may actively trigger the random access procedure by detecting a signal strength change.

In the random access procedure, the terminal may add the new coverage level of the terminal to a message in the random access procedure, and send the message to the core network node by means of the access network node, so that the core network node obtains the new coverage level of the terminal according to the received message. For example, the terminal may add the new coverage level of the terminal to a packet data unit (PDU) message, and send the PDU message to the core network node by means of the access network node, so that the core network node obtains the new coverage level of the terminal according to the received message.

In another possible implementation manner, a manner for receiving, by the core network node, the new coverage level sent by the access network node is as follows: The access network node receives coverage information sent by the terminal, determines a new coverage level according to the received coverage information, and then sends the new coverage level to the core network node. In this case, the core network node can receive the new coverage level sent by the access network node. Specifically, a specific process of determining the new coverage level of the terminal by the access network node according to the coverage information sent by the terminal is as follows: the access network node may obtain the coverage information of the terminal in at least one of the routing area update procedure, the cell update procedure, or the random access procedure that are described in manner 1, and determine the new coverage level of the terminal according to the obtained coverage information of the terminal. For example, when the coverage information of the terminal is a receive level of a signal, if the coverage information that is of the terminal and that is obtained by the access network node in the cell update procedure is −90 dBm, it indicates that the terminal is in an extremely poor coverage environment. In this case, the access network node may determine a new coverage level of the terminal according to the coverage information, for example, the new coverage level may be 20 dB coverage enhancement.

Manner 2: The core network node receives coverage information sent by the access network node, determines a new coverage level according to the received coverage information, and then updates the terminal coverage level according to the determined new coverage level.

In a possible implementation manner, a manner for receiving, by the core network node, the coverage information sent by the access network node may be as follows: The access network node receives coverage information sent by the terminal, and sends the coverage information to the core network node. In this case, the core network node can receive the coverage information sent by the access network node.

The core network node may obtain the coverage information of the terminal in at least one of the routing area update procedure, the cell update procedure, or the random access procedure that are described in manner 1, and determine the new coverage level of the terminal according to the obtained coverage information.

It should be noted that, in this embodiment of the present invention, obtaining the coverage information of the terminal or the new coverage level of the terminal by the core network node in at least one of the routing area update procedure, the cell update procedure, or the random access procedure is only used as an example to describe how the core network node obtains the new coverage level of the terminal. Certainly, the core network node may obtain the coverage information of the terminal or the new coverage level of the terminal in another procedure performed between the core network node and the terminal. A process of obtaining the coverage information of the terminal or the new coverage level of the terminal by the core network node is not specifically limited in this embodiment of the present invention.

S502. The core network node sends a first packet paging message to the access network node.

The first packet paging message is used for paging the terminal, the first packet paging message includes the terminal information of the terminal, and the terminal information may include the terminal type.

Further, when the mapping table includes a terminal coverage level corresponding to the IMSI of the terminal, the terminal information may further include the terminal coverage level.

For example, specific content included in the first packet paging message may be shown in table 1.

TABLE 1

| Information elements | Type/Reference | Presence | Format | Length |
|---|---|---|---|---|
| PDU type | PDU type | M | V | 1 |
| IMSI | IMSI | M | TLV | 5-10 |
| DRX Parameters | DRX Parameters | O | TLV | 4 |
| BVCI | BVCI | C | TLV | 4 |
| Location Area | Location Area | C | TLV | 7 |
| Routing Area | Routing Area | C | TLV | 8 |
| BSS Area Indication (note) | BSS Area Indication | C | TLV | 3 |
| PFI | PFI | O | TLV | 3 |
| ABQP | ABQP | O | TLV | 13-? |
| QoS Profile | QoS Profile | M | TLV | 5 |
| P-TMSI | TMSI | O | TLV | 6 |
| Terminal Information | Terminal Information | O | TLV | 3 |

In table 1, the Information elements column shows information elements included in the first packet paging message. The Type/Reference column indicates types of the information elements included in the first packet paging message. The Presence column indicates whether the information elements included in the first packet paging message are mandatory. In the Presence column, O indicates that the information element is optional, M indicates that the information element is mandatory, and C indicates that the information element is conditional. The Format column indicates formats of the information elements included in the first packet paging message. In this column, TLV indicates that the format of the information element includes a type, a length, and a value, and V indicates that the format of the information element is a value. The Length column indicates lengths of the information elements included in the first packet paging message, and a length unit is byte.

It can be learned from table 1 that the information elements included in the first packet paging message sent by the core network node to the access network node may be a PDU type, an IMSI, discontinuous reception parameters (DRX), a Base Station Subsystem GPRS Protocol virtual connection identifier (BVCI), a Location Area, a Routing Area, a base station system area indication (BSS Area Indication), a packet flow identifier (PFI), an aggregate base station system quality of service profile (ABQP), a quality of service profile (QoS), a P-TMSI, and Terminal Information. A format of the terminal information may be a TLV format, and a length of the terminal information is 3 bytes.

When the terminal information includes the terminal type, a composition manner of the terminal information may be shown in table 2.

TABLE 2

| | | | Bit | | | | |
|---|---|---|---|---|---|---|---|
| 8 | 7 | 6 | 5 | 4 | 3 | 2 | 1 |

| Octet 1 | Information Element Identifier (English: Information Elements Identity, IEI for short) |
| Octet 2, 2a | Length Indicator |
| Octet 3 | Reserved | Terminal Type |

The octet 1 is used to indicate an IEI of the terminal information. For example, the IEI of the terminal information may be X90. The octets 2 and 2a are used to indicate a length of information content included in the terminal information. The octet 3 is used to indicate the information content included in the terminal information. For example, 3 low-order bits may be used to indicate the terminal type, and the remaining 5 bits may be reserved and used to subsequently indicate other information of the terminal. Specifically, a correspondence between the terminal type and code including 3 bits may be shown in table 3.

TABLE 3

| Code | Semantic |
|---|---|
| 000 | Normal terminal |
| 001 | M2M terminal |
| Other | Reserved |

When the terminal information includes the terminal type and the terminal coverage level, a composition manner of the terminal information may be shown in table 4.

TABLE 4

| | | | Bit | | | | |
|---|---|---|---|---|---|---|---|
| 8 | 7 | 6 | 5 | 4 | 3 | 2 | 1 |

| Octet 1 | IEI |
| Octet 2, 2a | Length Indicator |
| Octet 3 | Reserved | Coverage level (Coverage Class) | Terminal Type |

In table 4, 3 low-order bits may be used to indicate the terminal type, 3 bits from the fourth bit to the sixth bit are used to indicate the terminal coverage level, and the remaining 2 bits are reserved bits and used to subsequently indicate other information of the terminal. Specifically, the correspondence between the terminal type and code including 3 low-order bits may be shown in table 3, and a correspondence between the terminal coverage level and code including the 3 bits from the fourth bit to the sixth bit may be shown in table 5.

TABLE 5

| Coding | Semantic |
|---|---|
| 000 | No need of coverage enhancement |
| 001 | 10 dB coverage enhancement |
| 010 | 20 dB coverage enhancement |
| Other | Reserved |

S503. The access network node receives the first packet paging message sent by the core network node.

After the access network node receives the first packet paging message sent by the core network node, that the access network node determines, according to the first packet paging message, that the terminal is the M2M terminal may specifically include S504.

S504. The access network node determines, according to a terminal type included in the terminal information, that a terminal is an M2M terminal.

The access network node may determine, according to the terminal information that is carried in the first packet paging message and that includes the terminal type, whether the terminal is the M2M terminal. After the terminal is determined as the M2M terminal, perform S505. When the access network node determines that the terminal is a normal terminal, the access network node may send a non-coverage-enhanced second packet paging message to the terminal.

For example, a process of determining, by the access network node according to the terminal type included in the first packet paging message, whether the terminal is an M2M terminal may be as follows: When the composition manner of the terminal information in the first packet paging message received by the access network node is shown in table 2, if code including 3 low-order bits of the octet 3 in the terminal information is 001, the access network node can look up table 3 according to the code 001, to determine that the terminal is an M2M terminal. If the code including 3 low-order bits of the octet 3 in the terminal information is 000, the access network node can look up table 3 according to the code 000, to determine that the terminal is a normal terminal.

S505. The access network node sends a coverage-enhanced second packet paging message to the terminal.

Features of the coverage-enhanced second packet paging message may be as follows: More time domain resources are occupied for transmitting a coverage-enhanced second packet paging message than transmitting a non-coverage-enhanced second packet paging message. More frequency resources are occupied for transmitting a coverage-enhanced second packet paging message than transmitting a non-coverage-enhanced second packet paging message. Transmit power for transmitting a coverage-enhanced second packet paging message is higher than transmit power for transmitting a non-coverage-enhanced second packet paging message. A modulation scheme used for transmitting a coverage-enhanced second packet paging message is more robust than a modulation scheme used for transmitting a non-coverage-enhanced second packet paging message. A coding scheme used for transmitting a coverage-enhanced second packet paging message is more robust than a coding scheme used for transmitting a non-coverage-enhanced second packet paging message. A quantity of bits used for transmitting a coverage-enhanced second packet paging message is smaller than a quantity of bits used for transmitting a non-coverage-enhanced second packet paging message.

Further, when the terminal information in the first packet paging message further includes the terminal coverage level, after the access network node determines, according to the terminal type included in the received first packet paging message, that the terminal is the M2M terminal, S505 may be specifically as follows: The access network node sends the coverage-enhanced second packet paging message to the terminal according to the terminal coverage level.

For example, a process of sending, by the access network node, the coverage-enhanced second packet paging message to the terminal according to the terminal coverage level may be as follows: When the composition manner of the terminal information in the first packet paging message received by the access network node is shown in table 4, if code including 3 bits from the fourth bit to the sixth bit of the octet 3 in the terminal information is 001, the access network node may first look up table 5 according to the code 001, to determine that the terminal coverage level is 10 dB coverage enhancement, that is, the access network node may determine that the coverage level required by the terminal is 10 dB coverage enhancement, and then may send the coverage-enhanced second packet paging message to the terminal according to the determined 10 dB coverage enhancement.

According to the paging method provided in this embodiment of the present invention, after receiving a first packet paging message sent by a core network node, an access network node can determine, according to the first packet paging message, whether a paged terminal is an M2M terminal, and send a coverage-enhanced second packet paging message to the terminal after determining that the paged terminal is the M2M terminal. The access network node can determine a type of the paged terminal by using the first packet paging message sent by the core network node, and send a corresponding second packet paging message to the terminal according to the determined type of the terminal. Therefore, after determining that the paged terminal is the M2M terminal, the access network node sends the coverage-enhanced second packet paging message to the terminal, and normal use of an M2M service of the terminal is ensured.

In addition, the first packet paging message sent by the core network node to the access network node may further include a terminal coverage level. After receiving the first packet paging message, the access network node may send the coverage-enhanced second packet paging message to the terminal according to the terminal coverage level included in the first packet paging message. In this way, the access network node may send a coverage-enhanced second packet paging message of a corresponding level to the terminal according to a coverage requirement of the terminal, so that a paging success rate of the M2M terminal is increased, and the normal use of the M2M service of the terminal is further ensured.

Figure 9:
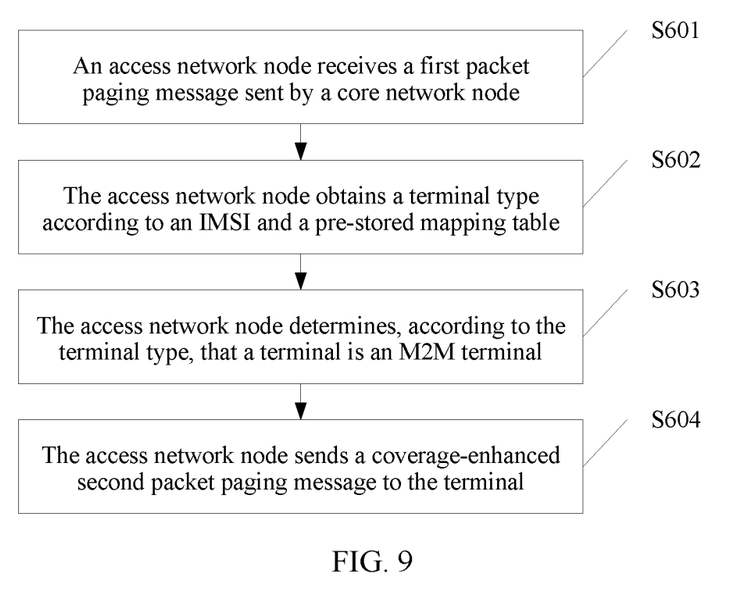
FIG. 9 is a flowchart of another paging method according to another embodiment of the present invention.

In another application scenario, information that is included in a first packet paging message and that is used to determine that a paged terminal is an M2M terminal is an IMSI of the terminal. In this case, an access network node can determine a type of the paged terminal according to a pre-stored mapping table in the access network node and the IMSI that is included in the received first packet paging message and that is of the terminal, and send a coverage-enhanced second packet paging message to the terminal after determining that the paged terminal is the M2M terminal. Specifically, as shown in FIG. 9, this method may include the following steps.

S601. The access network node receives a first packet paging message sent by a core network node.

The first packet paging message includes an IMSI of a terminal, and the first packet paging message is used for paging the terminal.

After the access network node receives the first packet paging message sent by the core network node, that the access network node can determine, according to the first packet paging message, that the terminal is an M2M terminal may specifically include the following steps: S602 and S603.

S602. The access network node obtains a terminal type according to an IMSI and a pre-stored mapping table.

After the access network node receives the first packet paging message sent by the core network node, the access network node may look up the pre-stored mapping table according to the IMSI that is included in the first packet paging message and that is of the terminal, to obtain the terminal type corresponding to the IMSI of the terminal.

The mapping table may include the IMSI of the terminal and the terminal type corresponding to the IMSI of the terminal. A composition manner of the mapping table may be shown in table 6. In table 6, an IMSI 1 indicates an IMSI of a first terminal, and an IMSI 2 indicates an IMSI of a second terminal. By analogy, an IMSI n indicates an IMSI of an $n^{th}$ terminal. Terminal Type indicates a terminal type corresponding to an IMSI.

TABLE 6

| IMSI | Terminal Type |
| --- | --- |
| IMSI 1 | Normal Terminal |
| IMSI 2 | M2M Terminal |
| ... | ... |
| IMSI n | M2M Terminal |

For example, a process of obtaining the IMSI that is included in the mapping table and that is of the terminal, and the terminal type corresponding to the IMSI may be as follows: The access network node obtains, according to registration information of the terminal, the IMSI of the terminal and the terminal type corresponding to the IMSI, and stores, in the mapping table, the obtained IMSI of the terminal and the obtained terminal type corresponding to the IMSI. For example, the IMSI of the terminal and the terminal type corresponding to the IMSI may be obtained by the access network node according to subscription information of the terminal, or the IMSI of the terminal and the terminal type corresponding to the IMSI may be obtained according to an upper-layer service used by the terminal.

Further, the mapping table further includes a terminal coverage level corresponding to the IMSI of the terminal. In this case, a composition manner of the mapping table may be shown in table 7, and Coverage Class indicates a terminal coverage level corresponding to an IMSI.

TABLE 7

| IMSI | Terminal Type | Coverage Class |
| --- | --- | --- |
| IMSI 1 | Normal Terminal | No need coverage enhancement |
| IMSI 2 | M2M Terminal | 10 dB coverage enhancement |
| ... | ... | ... |
| IMSI n | M2M Terminal | dB coverage enhancement |

The access network node may obtain the terminal coverage level corresponding to the IMSI of the terminal when the terminal accesses a network, and store, in the mapping table, the obtained terminal coverage level corresponding to the IMSI. After the terminal accesses the network, the terminal coverage level may change. Therefore, the access network node needs to update the terminal coverage level that is stored in the mapping table and that corresponds to the IMSI of the terminal. Specifically, when the terminal coverage level changes, a new coverage level that is of the terminal and that corresponds to the IMSI of the terminal may be obtained by the access network node in any one of the following manners.

Manner 1: The access network node receives a new coverage level sent by the terminal, and updates the terminal coverage level in the mapping table according to the new coverage level.

The terminal may add, to messages such as a random access message, a measurement report message, or uplink data, an extended information element that carries the new coverage level of the terminal, so as to report the new coverage level of the terminal to the access network node.

Manner 2: The access network node receives coverage information sent by the terminal, determines a new coverage level according to the coverage information, and further updates the terminal coverage level in the mapping table according to the new coverage level.

The terminal may add, to messages such as a random access message, a measurement report message, or uplink data, an extended information element that carries the coverage information of the terminal. In this way, the access network node can obtain the coverage information of the terminal according to the extended information element in the messages such as the random access message, the measurement report message, or the uplink data, then determine the new coverage level of the terminal according to the obtained coverage information of the terminal, and update the terminal coverage level according to the new coverage level. For example, when the coverage information of the terminal is a receive level of a signal, if the coverage information that is of the terminal and that is obtained by the access network node by using the random access message is −95 dBm, it indicates that the terminal is in an extremely poor coverage environment. In this case, the access network node may determine a new coverage level of the terminal according to the coverage information, for example, the determined new coverage level may be 20 dB coverage enhancement.

S603. The access network node determines, according to the terminal type, that a terminal is an M2M terminal.

The access network node may determine, according to the IMSI of the terminal and the pre-stored mapping table, whether the terminal is an M2M terminal. When the terminal is determined as an M2M terminal, perform S604. When the access network node determines that the terminal is a normal terminal, the access network node may send a non-coverage-enhanced second packet paging message to the terminal.

For example, when the composition manner of the pre-stored mapping table in the access network node is the manner shown in table 6, if the IMSI that is included in the first packet paging message received by the access network node and that is of the terminal is the IMSI 2, the access network node may look up the pre-stored mapping table according to the IMSI 2, to determine that the terminal type is the M2M terminal. If the IMSI that is included in the first packet paging message received by the access network node and that is of the terminal is the IMSI 1, the access network node may look up the pre-stored mapping table according to the IMSI 1, to determine that the terminal type is the normal terminal.

S604. The access network node sends a coverage-enhanced second packet paging message to the terminal.

Features of the coverage-enhanced second packet paging message may be as follows: More time domain resources are occupied for transmitting a coverage-enhanced second packet paging message than transmitting a non-coverage-enhanced second packet paging message. More frequency resources are occupied for transmitting a coverage-enhanced second packet paging message than transmitting a non-coverage-enhanced second packet paging message. Transmit power for transmitting a coverage-enhanced second packet paging message is higher than transmit power for transmitting a non-coverage-enhanced second packet paging message. A modulation scheme used for transmitting a coverage-enhanced second packet paging message is more robust than a modulation scheme used for transmitting a non-coverage-enhanced second packet paging message. A coding scheme used for transmitting a coverage-enhanced second packet paging message is more robust than a coding scheme used for transmitting a non-coverage-enhanced second packet paging message. A quantity of bits used for transmitting a coverage-enhanced second packet paging message is smaller than a quantity of bits used for transmitting a non-coverage-enhanced second packet paging message.

Further, when the mapping table stored in the access network node further includes a terminal coverage level corresponding to the IMSI of the terminal, after the access network node determines, according to the mapping table stored in the access network node and the IMSI that is included in the received first packet paging message and that is of the terminal, that the paged terminal is the M2M terminal, S604 may be specifically as follows: The access network node obtains the terminal coverage level according to the IMSI and the mapping table, and sends the coverage-enhanced second packet paging message to the terminal according to the obtained terminal coverage level.

For example, when the composition manner of the pre-stored mapping table in the access network node is the manner shown in table 7, if the IMSI that is included in the first packet paging message received by the access network node from the core network node and that is of the terminal is the IMSI 2, the access network node looks up the pre-stored mapping table according to the IMSI 2, and can obtain the terminal coverage level of 10 dB coverage enhancement.

According to the paging method provided in this embodiment of the present invention, after receiving a first packet paging message sent by a core network node, an access network node can determine, according to the first packet paging message, whether a paged terminal is an M2M terminal, and send a coverage-enhanced second packet paging message to the terminal after determining that the paged terminal is the M2M terminal. The access network node can determine a type of the paged terminal by using the first packet paging message sent by the core network node, and send a corresponding second packet paging message to the terminal according to the determined type of the terminal. Therefore, after determining that the paged terminal is the M2M terminal, the access network node sends the coverage-enhanced second packet paging message to the terminal, and normal use of an M2M service of the terminal is ensured.

In addition, when a mapping table further includes a terminal coverage level, the access network node can determine, according to an IMSI of the terminal, the coverage level of the terminal that needs to be paged. In this way, the access network node may send a coverage-enhanced second packet paging message of a corresponding level to the terminal according to the obtained terminal coverage level. The access network node sends a coverage-enhanced second packet paging message of a corresponding level to the terminal according to a coverage requirement of the terminal, so that a paging success rate of the M2M terminal is increased, and the normal use of the M2M service running on the terminal is further ensured.

The foregoing descriptions about implementation manners allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein again.

In the several embodiments provided in the present application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the present invention essentially, or the part contributing to the prior art, or all or some of the technical solutions may be implemented in the form of a software product. The software product may be stored in a storage medium and includes several instructions for instructing a device (which may be a single-chip microcomputer, a chip or the like) or a processor to perform all or some of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A paging method, comprising:
sending, by a core network node, a first packet paging message;
receiving, by an access network node, the first packet paging message from the core network node, wherein the first packet paging message is used for paging a terminal; wherein the first packet paging message comprises terminal information of the terminal, the terminal information comprises a terminal coverage level, and the terminal coverage level is used by the access network node to determine a coverage enhancement level when the access network node pages the terminal;

determining, by the access network node according to the first packet paging message, that the terminal is a machine to machine terminal; and sending, by the access network node, a coverage-enhanced second packet paging message to the terminal.

2. The method according to claim 1, wherein the terminal information comprises a terminal type; and wherein the determining, by the access network node according to the first packet paging message, that the terminal is a machine to machine terminal comprises:

determining, by the access network node according to the terminal type comprised in the terminal information, that the terminal is a machine to machine terminal.

3. The method according to claim 2, further comprising one of:

receiving, by the access network node, a new coverage level sent by the terminal, and sending the new coverage level to the core network node;

receiving, by the access network node, coverage information sent by the terminal, determining a new coverage level according to the coverage information, and sending the new coverage level to the core network node; and receiving, by the access network node, coverage information sent by the terminal, and sending the coverage information to the core network node.

4. The method according to claim 1, wherein the first packet paging message comprises an international mobile subscriber identity (IMSI) of the terminal; and wherein the determining, by the access network node according to the first packet paging message, that the terminal is a machine to machine terminal comprises:

obtaining, by the access network node, a terminal type according to the IMSI and a pre-stored mapping table, wherein the mapping table comprises the IMSI and the terminal type corresponding to the IMSI; and determining, by the access network node according to the terminal type, that the terminal is a machine to machine terminal.

5. The method according to claim 4, wherein the mapping table further comprises a terminal coverage level corresponding to the IMSI; and wherein the sending, by the access network node, a coverage-enhanced second packet paging message to the terminal comprises:

obtaining, by the access network node, the terminal coverage level according to the IMSI and the mapping table; and sending, by the access network node, the coverage-enhanced second packet paging message to the terminal according to the terminal coverage level.

6. The method according to claim 5, further comprising one of:

receiving, by the access network node, a new coverage level sent by the terminal, and updating, by the access network node, the terminal coverage level in the mapping table according to the new coverage level; and receiving, by the access network node, coverage information sent by the terminal, and determining a new coverage level according to the coverage information, and updating, by the access network node, the terminal coverage level in the mapping table according to the new coverage level.

7. The method according to claim 1, further comprising:

obtaining, by the core network node, the terminal information according to an international mobile subscriber identity (IMSI) of the terminal and a pre-stored mapping table before the first packet paging message is sent to the access network node by using the communications interface, wherein the mapping table comprises the IMSI and the terminal information that corresponds to the IMSI of the terminal.

8. The method according to claim 1, further comprising:

receiving, by the core network node, a new coverage level sent by the access network node; and updating, by the core network node, the terminal coverage level in the terminal information according to the new coverage level received by using the communications interface.

9. The method according to claim 1, further comprising:

determining, by the core network node, a new coverage level according to the coverage information received by using the communications interface; and updating, by the core network node, the terminal coverage level in the terminal information according to the new coverage level.

10. A core network node, comprising:

a processor;

a memory coupled to the processor, the memory comprising instructions that, when executed by the processor, cause the core network node to:

send a first packet paging message to a communications interface of an access network node, wherein the first packet paging message is used for paging a terminal; wherein the first packet paging message comprises terminal information of the terminal, the terminal information comprises a terminal coverage level, and the coverage level is used by the access network node to determine a coverage enhancement level when the access network node pages the terminal.

* * * * *

UNITED STATES PATENT AND TRADEMARK OFFICE
CERTIFICATE OF CORRECTION

PATENT NO.         : 11,206,518 B2
APPLICATION NO.    : 16/586325
DATED              : December 21, 2021
INVENTOR(S)        : Liu et al.

It is certified that error appears in the above-identified patent and that said Letters Patent is hereby corrected as shown below:

On the Title Page

Page 2, Other Publications, Line 12: "2014, 3GPP TS 22 368 V13.0.0, 3rd Generation Partnership Project," should read -- 2014, 3GPP TS 22.368 V13.0.0, 3rd Generation Partnership Project, --.

Signed and Sealed this
Twenty-fourth Day of May, 2022

Katherine Kelly Vidal
*Director of the United States Patent and Trademark Office*